April 23, 1968 A. J. SOLDANO 3,379,931

ELECTROLUMINESCENT TRANSLATOR UTILIZING THIN FILM TRANSISTORS

Filed Dec. 1, 1964

INVENTOR.
ANTHONY J. SOLDANO

BY R. J. Frank
ATTORNEY.

United States Patent Office 3,379,931 Patented Apr. 23, 1968

3,379,931
ELECTROLUMINESCENT TRANSLATOR UTILIZING THIN FILM TRANSISTORS

Anthony J. Soldano, Valley Stream, N.Y., assignor to General Telephone and Electronics Laboratories, Inc., a corporation of Delaware Filed Dec. 1, 1964, Ser. No. 415,089
4 Claims. (Cl. 315—169)

ABSTRACT OF THE DISCLOSURE

An electroluminescent translator is described wherein first and second thin film transistors are connected in series with corresponding lamps and an energizing voltage is applied across the parallel combination thereof. The gate of the second transistor is coupled by a diode to an electrode of the first transistor. The application of a signal to the gate of the first transistor energizes the corresponding lamp and the absence of a signal results in the application of a voltage to the gate of the second transistor and energizes the corresponding lamp.

This invention relates to an electroluminescent translator and more particularly to an electroluminescent translator employing thin film components for the provision of discrete light output signals in response to a binary input signal.

An electroluminescent translator functions to translate information-carrying electrical signals into appropriate light output signals by the selective energization of electroluminescent lamps. The information-carrying input signals are normally in binary form, wherein the presence or absence of a pulse at a particular time characterizes the information. The light output signals correspond to either pulses or the absence thereof and are supplied to electroluminescent photoconductive logic circuits for further processing.

The light output signals of the translator are produced by the energization of one of two electroluminescent lamps. Upon the receipt of a binary pulse, one of the electroluminescent lamps is energized. If the next succeeding binary interval should be characterized by the absence of a pulse, an inversion must take place with the second lamp being energized and the first lamp being extinguished. However, if this interval is characterized by the presence of a pulse, no inversion would occur and the first lamp remains energized.

The present invention is directed to an electroluminescent translator which is compatible with electroluminescent-photoconductive logic circuits in that it may be formed on the same or a similar substrate. The translator employs thin-film components on the electroluminescent lamp substrate which are capable of handling the relatively high voltages, within the approximate range of 50 to 100 volts, required to energize presently available electroluminescent lamps.

In accordane with the present invention, an electroluminescent lamp inverter is constructed which generates a light output signal for either the presence or absence of binary signal at a single input terminal.

The present translator comprises first and second electroluminescent lamps each connected in series with a corresponding thin-film transistor. As known in the art, a thin-film transistor is a three electrode device consisting of a semiconductor layer and a dielectric layer formed thereon. The semiconductor layer is provided with two electrodes and is connected in series with a corresponding electroluminescent lamp. The application of a bias volatge to a gate electrode mounted on the dielectric places a charge on the surface of the semiconductor layer and thereby changes the density of the mobile carriers in a conducting channel proximate the semiconductor surface. Varying the magnitude of the bias voltage enables the conductivity of the semiconductor layer to be modulated accordingly.

The two series combinations of an electroluminescent lamp and a thin-film transistor are connected in parallel and a source of alternating voltage is connected across the parallel combination of the two series combinations. The magnitude of the applied voltage is selected to be such that when applied across the electroluminescent lamp and an unbiased thin-film transistor, that portion of the voltage appearing across the electroluminescent lamp is insufficient to cause it to emit light. However, the magnitude of the applied voltage must exceed that threshold voltage required to energize the electroluminescent lamp alone.

As mentioned previously, the application of a voltage to the gate electrode of the thin-film transistor modulates the conductivity of the semiconductor layer. It has been found that this modulation occurs during both halves of the alternating cycle of the voltage appearing across the semiconductor layer. Thus, the application of an external signal to the gate may be used to increase or decrease the conductivity of the transistor and vary the voltage drop thereacross accordingly.

By selecting the magnitude of the alternating voltage to be greater than the threshold voltage required to light a single electroluminescent lamp, the application of a particular voltage to the gate electrode will result in sufficient lowering of the voltage drop across the transistor to cause the series-connected electroluminescent lamp to become energized and emit light. Thus, the voltage appearing at the gate electrode of each thin-film transistor independently determines whether or not the corresponding electroluminescent lamp emits light.

An external D.C. voltage is coupled to the gate electrode of one of the thin-glm transistors through an activating switch. The binary input signals are supplied to and control the activating switch. The switch may be responsive either to the presence or absence of a binary input pulse and the corresponding electroluminescent lamp will be energized accordingly.

The gate electrode of the second thin-film transistor is coupled through suitable rectifying means to the junction of the first thin-film transistor and its corresponding electroluminescent lamp. The rectifying means, which is preferably a thin film diode, is poled to pass only positive voltage transitions to the gate of the second transistor The diode is rendered non-conductive by the application of the external voltage to the gate of the first thin-film transistor, since this has lowered the voltage drop across the first transistor by increasing its conductivity and thus has lowered the voltage at said connection. The gate voltage of the second transistor thereupon decreases, primarily by the flow of reverse current through the diode until it reaches a potential substantially equal to the voltage at the junction.

When the external signal appearing at the gate of the first transistor is removed, its conductivity decreases and the voltage drop thereacross increase with the corresponding electroluminescent lamp being extinguished. However, this voltage increase is passed by the diode to the gate of the second transistor to in turn inversely vary its conductivity with respect to that of the first transistor and lower the voltage drop thereacross, thereby causing its corresponding electroluminescent lamp to emit light. This electroluminescent lamp continues to emit light until the switch is again actuated.

This translator circuit provides two discrete light outputs in response to a single binary input. The electroluminescent lamps in the circuit may be optically coupled to photoconductive elements in an electroluminescent-photoconductive logic circuit for further processing.

In addition, the present translator circuit is found well suited for thin-film techniques and may be formed on the same or a similar substrate as that used by the logic circuits. The gap geometry of the thin-film devices permits the application of a voltage thereacross in excess of that required to energize the corresponding electroluminescent lamp without causing breakdown.

Further features and advantages of the present invention will become more readily apparent from the following description of a specific embodiment when viewed in conjunction with the accompanying drawings in which.

Figure 1:
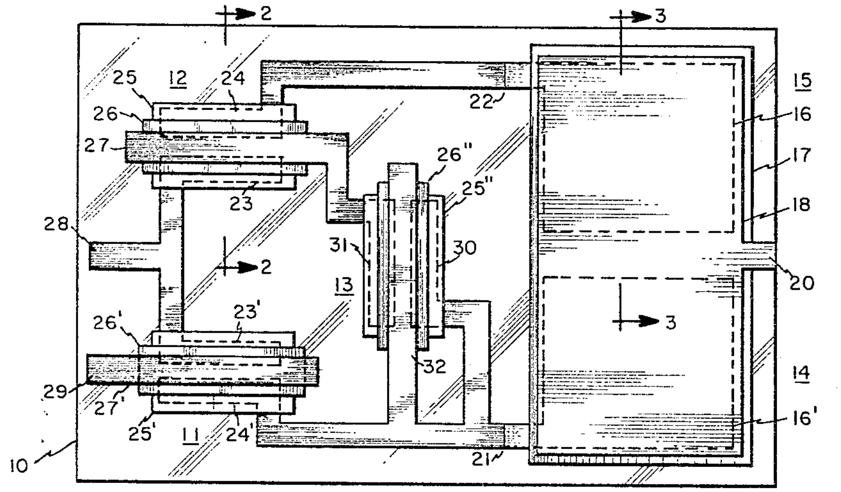
FIG. 1 is a top view of one embodiment of the invention.

Referring more particularly to FIG. 1, an electroluminescent translator employing thin film components is shown formed on substrate 10. The translator comprises first and second thin-film transistors 11 and 12, thin film diode 13 and first and second radiation emitting lamps 14 and 15.

The lamps 14 and 15 are similar in construction and are preferably electroluminescent lamps. The substrate 10 is advantageously chosen to be conductively coated glass and by conventional etching techniques well known to those skilled in the art, portions of the conductive coating may be removed. The remaining conductive coating is then utilized as the first or bottom electrodes 16 and 16' of the electroluminescent lamps and provides the electrical junctions 22 and 21 for the thin-film transistors and diode.

Figure 3:
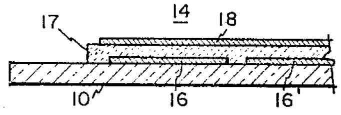
FIG. 3 is a side view in section of one electroluminescent lamp taken along lines 3—3 FIG. 1.

A layer 17 of electroluminescent material is then deposited on bottom electrodes 16 and 16'. This layer may be zinc sulfide suitably activated with copper, chlorine or other activators depending on the desired color of the light emitted. As shown in FIGS. 1 and 3, electroluminescent layer 17 overlies the bottom electrodes to insure the electrical separation of the bottom and top electrodes.

The second or top electrode 18 may be deposited upon electroluminescent layer 17. However, this electrode may also be a transparent conductive coating with an external connection 20. For many applications, a glass covering plate may be placed over the electroluminescent lamps and bonded about its edges. In addition to forming a compact, rugged electroluminescent lamp structure, this construction is found well suited for efficiently coupling the translator output to subsequent electroluminescent photoconductive logic circuits as suitable photoconductive elements may be formed on the top side of the glass covering plate overlying lamps 13 and 14.

After the formation of the electroluminescent lamps 14 and 15, a plurality of conducting paths are formed on the remaining portions of substrate 10. These conducting paths, which may be formed by depositing gold on the substrate, are electrically connected to the bottom electrodes of lamps 14 and 15 at junctions 21 and 22 respectively.

Connected in series with first and second electroluminescent lamps 14 and 15 are first and second thin-film transistors 11 and 12 respectively. Since thin-film transistors 11 and 12 are similar in construction and operation, the following description of transistor 12 applies also to transistor 11.

Figure 2:
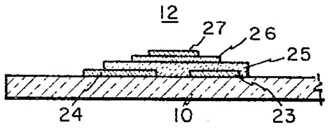
FIG. 2 is a side view in section of one thin film transistor taken along lines 2—2 of FIG. 1.

As shown in FIGS. 1 and 2, transistor 12 comprises first and second parallel spaced electrodes 23 and 24, hereinafter referred to as source and drain electrodes respectively. Deposited upon and between electrodes 23 and 24 is a layer of semiconductor material 25, such as cadmium sulfide having a thickness of about 1000 Angstroms. The gap between the parellel source and drain electrodes 23 and 24 containing the semiconductor is selected to be of the order of 0.003 inch wide and 0.125 inch long. A layer of insulating material 26, such as silicon monoxide, having a thickness of about 100 Angstroms, is deposited on semiconductor layer 25 and overlies the semiconductor gap. The third or gate electrode 27, which may be comprised of aluminum, is then formed on the dielectric layer 26.

Referring to FIG. 1, the source electrodes 23 and 23' of transistors 12 and 11 are connected to provide a common external connection 28, while their respective drain electrodes 24 and 24' are connected to the corresponding electroluminescent lamp at junctions 22 and 21. In connection with thin film transistors 11, the gate electrode 27' is provided with an external connection 29. However, the gate electrode 27 of transistor 12 is connected to the source electrode 31 of thin film diode 13.

Thin film diode 13 is structurally similar to the aforementioned thin-film transistors having a semiconductor layer 25'' deposited upon and between and parallel spaced drain and source electrodes 30 and 31. A dielectric layer 26'' is deposited thereon with a gate electrode 32 formed on the upper surface of layer 26''. As seen in FIG. 1, gate electrode 32 and drain electrode 30 are electrically connected in common to the connecting point 21 of first transistor 11 and first electroluminescent lamp 14.

Figure 5:
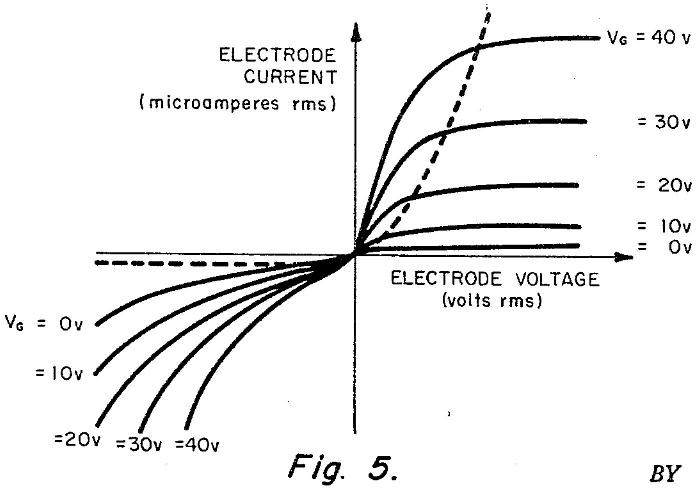
FIG. 5 is a graph showing representative current-voltage curves for the thin-film components of the embodiment of FIG. 1.

The electrode current versus electrode voltage characteristics of a typical thin-film transistor are shown by the solid curves of FIG. 5. These characteristics are nonlinear with the current between source and drain electrodes i.e. through the previously mentional semiconductor gap, being modulated by the application of a signal voltage $V_G$ between the gate and source electrodes. The current flowing through the semiconductor between the source and drain electrodes is determined primarily by the conductivity of the semiconductor material, which in turn, is a function of the density of the mobile carriers therein. By applying a positive voltage across the gate and source electrodes, the density of the carrier electrons is increased in the semiconductor region proximate the insulating layer 26 and thus a channel of relatively high conductivity is formed betwen the first and second electrodes. The conductivity of the channel is modulated by the signal voltage $V_G$.

Also, it has been found that connecting the gate electrode to either of the source and drain electrodes provides a thin film diode which may be formed in the same manner as the thin-film transistors previously described. In addition, the voltage drop across the diode is found to be a function of the thickness of the insulating layer. Thus, the voltage drop thereacross may be selected to be different from that of the thin-film transistors. Although a sandwich type of diode consisting of cadmium sulfide layer and a rectifying contact may be used, the low voltage capabilities of known sandwich diodes normally require a plurality to be stacked in series for the voltage levels present in the translator. The use of a series stack is found to increase the number of steps during manufacture and is therefore less desirable. Further, a conventional two electrode diode may be cemented on the substrate by standard techniques if desired.

By maintaining the gate electrode of a thin-film device at the same potential as the drain or source electrodes 30 and 31, current rectification is found to occur. The rectification characteristic for the described embodiment, wherein the gate electrode is connected to the drain electrode 30, is shown as the broken curve of FIG. 5. It will be noted that at positive drain electrode voltages, the rectification characteristic is determined by the points on the transistor characteristics wherein the electrode voltage equals the signal voltage $V_G$ on the gate electrode. In the region of negative drain electrode voltages, the signal voltage $V_G$ is likewise negative and therefore tends to deplete the afore-mentioned channel of carriers. Thus in the reverse direction, the conductivity of the semiconductor channel is substantially decreased as shown in FIG. 5.

Although the embodiment described above refers to a diode wherein the gate electrode is coupled to the drain electrode, rectification also takes place in thin film diodes in which the gate electrode is coupled to the source electrode. This results in the forward conducting characteristic being located in the third quadrant of the graph of FIG. 5. The reverse or nonconducting characteristic is then the zero bias voltage curve shown in the first quadrant of the graph of FIG. 5. The current rectification ratio of these thin film diodes depends primarily on the particular semiconductor material employed and with thin diodes formed of cadmium sulfide, current rectification ratios of about 200 have been attained.

Figure 4:
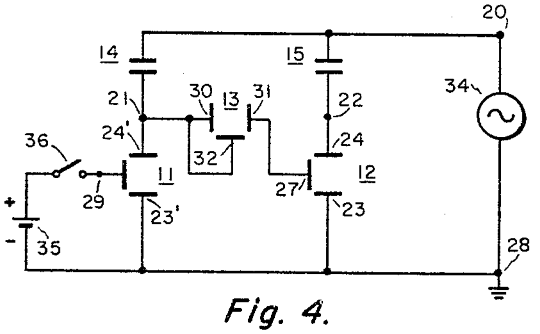
FIG. 4 is a schematic diagram of the embodiment of FIG. 1.

The schematic diagram of FIG. 4 shows the electrical connections for the embodiment shown in FIG. 1. Electroluminescent lamp 15 is connected in series with thin film transistor 12, while electroluminescent lamp 14 is connected in series with thin film transistor 11. The two series combinations are connected in parallel to common external connections 20 and 28. Thin film diode 13 is connected to the junction 21 of lamp 14 and transistor 11 and to the gate electrode of transistor 12. As shown, the diode is poled to pass positive signals to the gate of transistor 12.

The gate electrode of thin film transistor 11 is connected through external connection 29 to switch means 36 and signal voltage source 35. Switch means 36 is connected to suitable actuating means (not shown) to be responsive to the binary signal to be inverted and may be closed by either the presence or absence of signals.

Connected between external connections 20 and 28 is an alternating voltage source 34. The magnitude of the voltage supplied by source 34 is selected to be less than the threshold voltage required to light either of the electroluminescent lamps when its corresponding transistor is in its low conductivity or zero bias voltage state. However, source 34 must supply a voltage sufficient to light either of the lamps when its corresponding transistor is biased to a relatively high conductivity state.

During normal operation, switch 36 is closed in response to the presence of a binary pulse and signal voltage source 35 is connected to the gate of transistor 11. This increases the conductivity of transistor 11 so that the portion of the supplied alternating voltage across lamp 14 enables it to be energized to emit light. The voltage at junction 21 thereupon decreases, which transition is bloced by diode 13 from passing to the gate of transistor 12.

If at the time of the next binary signal a pulse is present, the actuating means causes switch 36 to remain closed and lamp 14 continues to emit light. However, if no pulse appears, switch 36 opens to remove the signal voltage from the gate of transistor 11. This in turn decreases the conductivity of transistor 11, raises the voltage level of junction 21 and thereby lowers the alternating voltage appearing across lamp 14 to a level where it can no longer emit light. The positive transistion appearing at junction 21 is passed by diode 13 to the gate of transistor 12. This increases the conductivity of the transistor and increases the alternating voltage appearing across lamp 15 so that it is energized to emit light. Thus, it is to be noted that the conductivities of the thin film transistors are varied in an inverse relationship.

At the appearance of the next binary pulse, switch 36 is again closed and electroluminescent lamp 14 is energized to emit light. The voltage at the gate of transistor 12 thereupon decreases by the flow of reverse current through the semiconductor layer of diode 13 and lamp 15 no longer emits light. Thus, the present translator provides two discrete light output signals while requiring only a single binary input signal. Although normally open switch 36 is actuated by the presence of a binary pulse, it will be understood that other switching combinations might also be employed.

In one embodiment tested and operated using cadmium sulfide thin film components and zinc sulfide lamps, the voltage of source 34 was 70 volts at a frequency of 1 kilocycle and the bias voltage of source 35 was 25 volts. The voltage appearing across the thin film transistors was found to be 60 volts for the zero bias condition and 24 volts for the biased high conductivity state with the voltage drop across diode 13 being about 15 volts. The electroluminescent lamps employed emitted light when energized by a voltage of 45 volts and did not when the voltage dropped to 25 volts.

While the above description has referred to a single embodiment, it will be understood that many changes, modifications and different materials may be employed without departing from the spirit and scope of the invention.

What is claimed is:

1. An electroluminescent translator circuit for translating an information-carrying input signal into light output signals by the selective energization of electroluminescent lamps, which comprises:

(a) a first electroluminescent lamp having first and second electrodes, said lamp emitting light when energized by a voltage exceeding a threshold amount (b) a first thin-film transistor having first, second and gate electrodes, said first electrode being coupled to the first electrode of said first lamp;

(c) a second electroluminescent lamp having first and second electrodes, said second electrode being coupled to the second electrode of said first lamp, said lamp emitting light when energized by a voltage exceeding a threshold amount;

(d) a second thin-film transistor having first, second and gate electrodes, said first electrode being coupled to the first electrode of said second lamp, said second electrode being coupled to the second electrode of said first transistor;

(e) means for applying an energizing voltage between the second electrode of said second lamp and the second electrode of said second transistor;

(f) means for applying a signal to the gate electrode of said first transistor, the application of said signal varying the conductivity of said first transistor whereby said first lamp is energized to emit light; and (g) rectifying means connected between the first electrode of the first transistor and the gate electrode of the second transistor, the signals coupled to the gate electrode of said second transistor modulating its conductivity inversely with respect to that of said first transistor whereby said second lamp is energized to emit light when said first lamp is extinguished.

2. The translator circuit of claim 1 wherein said rectifying means is poled to pass voltage transitions from the first electrode of said first transistor to the gate electrode of said second transistor which increase the conductivity of said second transistor.

3. The translator circuit of claim 2 wherein said rectifying means is a thin film diode having first, second and gate electrodes, said first electrode being coupled to the first electrode of said first transistor, said second electrode being coupled to the gate electrode of said second transistor, said gate electrode being connected to one of the first and second electrodes of said diode.

4. The translator circuit of claim 3 wherein said translator is formed on a single substrate.

References Cited

UNITED STATES PATENTS

| | | | |
|---|---|---|---|
| 2,964,653 | 12/1960 | Cagle et al. | 307—88.5 |
| 3,028,507 | 4/1962 | Sacks | 307—88.5 |
| 3,246,162 | 4/1966 | Chin | 315—169 X |
| 3,258,663 | 6/1966 | Weimer | 317—234 |
| 3,270,235 | 8/1966 | Loebner | 313—108 |
| 3,284,083 | 11/1966 | Levin et al. | 307—88.5 |
| 3,293,512 | 12/1966 | Simmons et al. | 317—235 |
| 3,309,610 | 3/1967 | Yamamoto | 315—169 |

JOHN W. HUCKERT, *Primary Examiner.*

A. J. JAMES, *Assistant Examiner.*